United States Patent
Hirose et al.

(10) Patent No.: US 6,694,339 B1
(45) Date of Patent: Feb. 17, 2004

(54) FILE MANAGEMENT DEVICE AND METHOD THEREOF, AND AUDIO VISUAL DATA RECORDING/REPRODUCING DEVICE AND METHOD THEREOF

(75) Inventors: Masaki Hirose, Kanagawa (JP); Jun Yoshikawa, Kanagawa (JP); Satoshi Katsuo, Kanagawa (JP); Shouji Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 128 days.

(21) Appl. No.: 09/718,537

(22) Filed: Nov. 22, 2000

Related U.S. Application Data

(63) Continuation of application No. PCT/JP00/01792, filed on Mar. 23, 2000.

(30) Foreign Application Priority Data

Mar. 26, 1999 (JP) .......................................... 11-082970

(51) Int. Cl.[7] .............................................. G06F 17/30
(52) U.S. Cl. ..................................................... 707/203
(58) Field of Search .......................... 707/200, 1, 203, 707/204; 360/48; 369/13.35

(56) References Cited

U.S. PATENT DOCUMENTS

| | | | | |
|---|---|---|---|---|
| 5,410,100 A | * | 4/1995 | Kim ............................. 84/645 |
| 5,481,519 A | * | 1/1996 | Hosoya .................... 369/53.21 |
| 5,544,360 A | * | 8/1996 | Lewak et al. .................... 707/1 |
| 5,680,609 A | * | 10/1997 | Reinhardt ..................... 707/10 |
| 5,902,115 A | * | 5/1999 | Katayama ................... 434/307 |
| 6,029,200 A | * | 2/2000 | Beckerman et al. ........ 709/226 |
| 6,058,390 A | * | 5/2000 | Liaw et al. ..................... 707/2 |
| 6,094,414 A | * | 7/2000 | Taira et al. ............. 369/275.3 |
| 6,130,985 A | * | 10/2000 | Fujita .......................... 386/95 |
| 6,189,016 B1 | * | 2/2001 | Cabrera et al. ............. 707/203 |
| 6,192,375 B1 | * | 2/2001 | Gross ......................... 707/200 |
| 6,205,445 B1 | * | 3/2001 | Tokuyama ................... 707/10 |
| 6,269,420 B1 | * | 7/2001 | Horie ......................... 711/103 |
| 6,269,434 B1 | * | 7/2001 | Tanaka ....................... 711/170 |
| 6,339,786 B1 | * | 1/2002 | Ueda et al. ................. 709/217 |
| 6,341,278 B1 | * | 1/2002 | Yamamoto et al. ........... 707/2 |
| 6,370,325 B2 | * | 4/2002 | Nakatani et al. ........... 386/126 |
| 6,425,078 B1 | * | 7/2002 | Smith et al. .................... 713/1 |
| 6,453,325 B1 | * | 9/2002 | Cabrera et al. ............. 707/204 |

FOREIGN PATENT DOCUMENTS

JP          3-127238          5/1991

\* cited by examiner

*Primary Examiner*—John Breene
*Assistant Examiner*—Cheryl Lewis
(74) *Attorney, Agent, or Firm*—Frommer Lawrence & Haug LLP; William S. Frommer

(57) ABSTRACT

A recording medium is logically divided to form a cluster. Each cluster records AV (Audio Visual) data. A reference number indicates the number of files which reference AV data. A free space byte map having the reference number is used for determining whether to enable or disable deletion of AV data on a cluster basis. That is, a cluster having the reference number 0 is released as a free area, thus facilitating management of a file and realizing effective use of a recording medium.

24 Claims, 14 Drawing Sheets

| K FILE ENTRIES (FE) |
|---|
| L RECORD ENTRIES (RE) |
| M FREE SPACE ENTRIES (FSLE) |

FILE MANAGEMENT INFORMATION

FIG.2A

| FILE NAME |
|---|
| LINK TO FIRST RE |

FILE ENTRY (FE)

FIG.2B

| LINK TO NEXT RE |
|---|
| HEAD POSITION DATA |
| RECORDING LENGTH (DATA LENGTH) OF CONTINUOUS AREA |

RECORD ENTRY (RE)

FIG.2C

| LINK TO NEXT FSLE |
|---|
| HEAD POSITION DATA |
| RECORDING LENGTH (DATA LENGTH) OF CONTINUOUS AREA |

FREE SPACE LIST ENTRY (FSLE)

FIG.2D

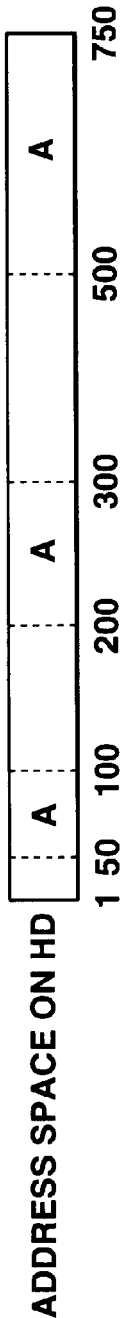
FIG.3A ADDRESS SPACE ON HD
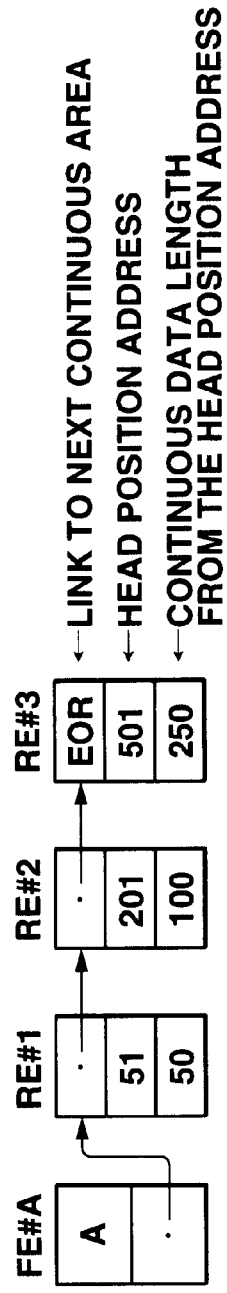
FIG.3B
FIG.3C

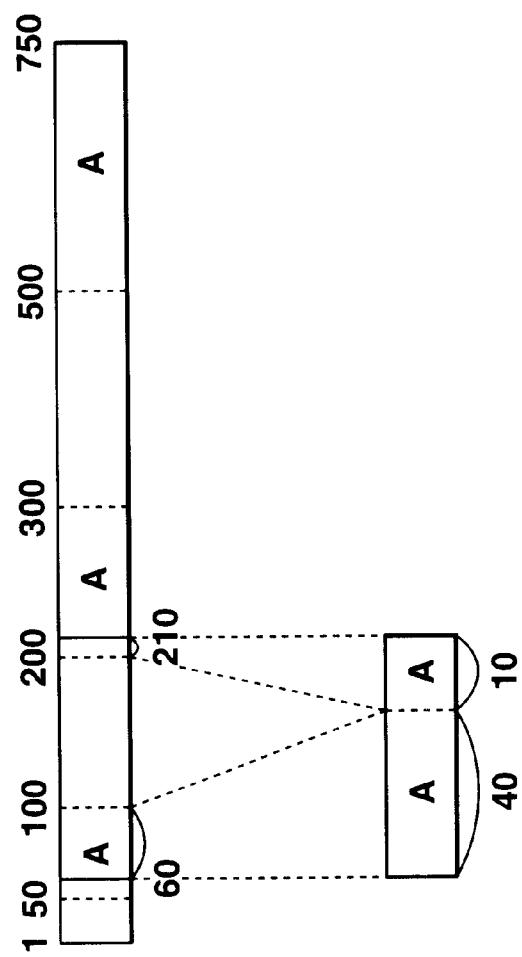

| LINK TO NEXT RE |
|---|
| HEAD ADDRESS |
| DATA TABLE |
| CONTROL FLAG |

| FILE NAME |
|---|
| LINK TO FIRST RE |
| FILE NAME OF A FILE TO WHICH REFERENCE IS MADE |
| . . . |
| LINK NUMBER BY VFL |

FE OF VFL

FIG.7A

| FILE NAME |
|---|
| LINK TO FIRST RE |
| LINK NUMBER BY VFL |

FE OF REFERENCE FILE

FIG.7B

|    | 00 | 01 | 02 | 03 | 04 | 05 | 06 | 07 | 08 | 09 |
|----|----|----|----|----|----|----|----|----|----|----|
| 00 | 0  | 0  | 0  | 0  | 0  | 0  | 0  | 0  | 0  | 0  |
| 10 | 0  | 0  | 0  | 0  | 0  | 0  | 0  | 0  | 0  | 0  |
| 20 | 0  | 0  | 0  | 0  | 0  | 0  | 0  | 0  | 0  | 0  |
| 30 | 0  | 0  | 0  | 0  | 0  | 0  | 0  | 0  | 0  | 0  |
| 40 | 0  | 0  | 0  | 0  | 0  | 0  | 0  | 0  | 0  | 0  |
| 50 | 0  | 0  | 0  | 0  | 0  | 0  | 0  | 0  | 0  | 0  |
| 60 | 0  | 0  | 0  | 0  | 0  | 0  | 0  | 0  | 0  | 0  |
| 70 | 0  | 0  | 0  | 0  | 0  | 0  | 0  | 0  | 0  | 0  |
| 80 | 0  | 0  | 0  | 0  | 0  | 0  | 0  | 0  | 0  | 0  |
| 90 | 0  | 0  | 0  | 0  | 0  | 0  | 0  | 0  | 0  | 0  |
| 100| 0  | 0  | 0  | 0  | 0  | 0  | 0  | 0  | 0  | 0  |
| 110| 0  | 0  | 0  | 0  | 0  | 0  | 0  | 0  | 0  | 0  |

The 09 column is labeled CLUSTER ENTRY.

FREE SPACE BYTE MAP

FIG.11

|    | 00 | 01 | 02 | 03 | 04 | 05 | 06 | 07 | 08 | 09 |
|----|----|----|----|----|----|----|----|----|----|----|
| 00 | 1  | 1  | 1  | 1  | 1  | 1  | 1  | 1  | 1  | 1  |
| 10 | 1  | 1  | 1  | 1  | 1  | 1  | 1  | 1  | 1  | 1  |
| 20 | 1  | 1  | 1  | 1  | 0  | 0  | 0  | 0  | 0  | 0  |
| 30 | 0  | 0  | 0  | 0  | 0  | 0  | 0  | 0  | 0  | 0  |
| 40 | 0  | 0  | 0  | 0  | 0  | 1  | 1  | 1  | 1  | 1  |
| 50 | 1  | 1  | 1  | 1  | 1  | 1  | 1  | 1  | 1  | 1  |
| 60 | 1  | 1  | 1  | 1  | 1  | 1  | 1  | 1  | 0  | 0  |
| 70 | 0  | 0  | 0  | 0  | 0  | 0  | 0  | 0  | 0  | 0  |
| 80 | 0  | 0  | 0  | 0  | 0  | 0  | 0  | 0  | 0  | 1  |
| 90 | 1  | 1  | 1  | 1  | 1  | 1  | 1  | 1  | 1  | 1  |
| 100| 1  | 1  | 1  | 1  | 1  | 0  | 0  | 0  | 0  | 0  |
| 110| 0  | 0  | 0  | 0  | 0  | 0  | 0  | 0  | 0  | 0  |

Row 00 is labeled REFERENCE NUMBER; column 09 is labeled CLUSTER ENTRY.

FREE SPACE BYTE MAP

FIG.12

|  | 00 | 01 | 02 | 03 | 04 | 05 | 06 | 07 | 08 | 09 |
|---|---|---|---|---|---|---|---|---|---|---|
| 00 | 1 | 1 | 1 | 1 | 1 | 1 | 1 | 1 | 1 | 1 |
| 10 | 1 | 1 | 2 | 2 | 2 | 2 | 1 | 1 | 1 | 1 |
| 20 | 1 | 1 | 1 | 1 | 0 | 0 | 0 | 0 | 0 | 0 |
| 30 | 0 | 0 | 0 | 0 | 0 | 0 | 0 | 0 | 0 | 0 |
| 40 | 0 | 0 | 0 | 0 | 0 | 1 | 1 | 1 | 1 | 1 |
| 50 | 1 | 1 | 1 | 1 | 2 | 2 | 1 | 1 | 1 | 1 |
| 60 | 1 | 1 | 1 | 1 | 1 | 1 | 1 | 1 | 0 | 0 |
| 70 | 0 | 0 | 0 | 0 | 0 | 0 | 0 | 0 | 0 | 0 |
| 80 | 0 | 0 | 0 | 0 | 0 | 0 | 0 | 0 | 0 | 1 |
| 90 | 2 | 2 | 2 | 2 | 2 | 2 | 2 | 2 | 1 | 1 |
| 100 | 1 | 1 | 1 | 1 | 1 | 0 | 0 | 0 | 0 | 0 |
| 110 | 0 | 0 | 0 | 0 | 0 | 0 | 0 | 0 | 0 | 0 |

FIG.13A

|  | 00 | 01 | 02 | 03 | 04 | 05 | 06 | 07 | 08 | 09 |
|---|---|---|---|---|---|---|---|---|---|---|
| 00 | 0 | 0 | 0 | 0 | 0 | 0 | 0 | 0 | 0 | 0 |
| 10 | 0 | 0 | 1 | 1 | 1 | 1 | 0 | 0 | 0 | 0 |
| 20 | 0 | 0 | 0 | 0 | 0 | 0 | 0 | 0 | 0 | 0 |
| 30 | 0 | 0 | 0 | 0 | 0 | 0 | 0 | 0 | 0 | 0 |
| 40 | 0 | 0 | 0 | 0 | 0 | 0 | 0 | 0 | 0 | 0 |
| 50 | 0 | 0 | 0 | 0 | 1 | 1 | 0 | 0 | 0 | 0 |
| 60 | 0 | 0 | 0 | 0 | 0 | 0 | 0 | 0 | 0 | 0 |
| 70 | 0 | 0 | 0 | 0 | 0 | 0 | 0 | 0 | 0 | 0 |
| 80 | 0 | 0 | 0 | 0 | 0 | 0 | 0 | 0 | 0 | 0 |
| 90 | 1 | 1 | 1 | 1 | 1 | 1 | 1 | 1 | 0 | 0 |
| 100 | 0 | 0 | 0 | 0 | 0 | 0 | 0 | 0 | 0 | 0 |
| 110 | 0 | 0 | 0 | 0 | 0 | 0 | 0 | 0 | 0 | 0 |

FIG.13B

FILE MANAGEMENT DEVICE AND METHOD THEREOF, AND AUDIO VISUAL DATA RECORDING/REPRODUCING DEVICE AND METHOD THEREOF

This is a continuation of copending International Application PCT/JP00/01792 having an international filing date of Mar. 23, 2000.

TECHNICAL FIELD

The present invention relates to a file management device and a method thereof, and an audio visual data recording/reproducing device and a method thereof Particularly, the present invention relates to a file management device and a method thereof, and an audio visual data recording/reproducing device and a method thereof for easily managing files.

BACKGROUND ART

For example, a news program broadcast in a broadcasting station presents a scene which provides brief cuts continuously. If AV data as desired material data are recorded at separate positions of one video tape which is used for editing such a news program or the like, it takes a time to place an edit point to the head. Besides, when material data recorded on a plurality of video tapes are edited, it is necessary to exchange the video tapes, making editing works inefficient.

In recent years, a broadcasting station or the like extensively uses a video server (AV server) which records AV (Audio Visual) data such as moving pictures or sound on a randomly accessible recording medium such as an HD (Hard Disk) and allows for editing or broadcasting by using the AV data.

The video server includes a large capacity recording device composed of a plurality of HDs called RAID (Redundant Arrays of Inexpensive Disks), and accordingly, since all of material data to be edited can be recorded in the RAID and the RAID is randomly accessible, there is no such a problem that it takes a time to put an edit point to the head or it is necessary to exchange recording media, as described above.

By the way, the video server handles the material data to be edited or edited AV data in units of files. There may be a need for creating a scene of contiguous short cuts as a file on a conventional video server, for example. In such a case, it has been a common practice to ensure a new recording region in the video server (RAID which the video server includes), and copy necessary material data to be edited in the record region like a dubbing operation of a video tape.

However, the material data is recorded in the video server. Re-copying or re-recording this data as an edit result on the video server is redundant and wasteful of recording areas since the same data is duplicated. Further, although random access is possible, copying data takes a time in some degree and, as a result, editing also takes a long time.

Then, for example, in Japanese Patent Application Laid-Open Publication No. 9-163310 or Japanese Patent Application Laid-Open Publication No. 9-284690, the present applicant proposed a virtual file system in which a virtual file (or VFL) is prepared as a file of AV data after editing for avoiding a waste of a recording area and shortening an edit time.

That is, a normal file (file not the virtual file) is prepared by actually recording AV data constituting the file. The AV data constituting a file as an edit result are formed of AV data in the already recorded file. With respect to the file as an edit result, it is possible to reproduce the AV data just by identifying recording positions of the already recorded AV data constituting the file without actually recording the AV data.

Then, the virtual file system makes it possible to reproduce the file as the edit result (virtual file) without copying the actual AV data by preparing information about the recording position where the AV data constituting the file as the edit result are recorded. That is, the virtual file is reproduced by accessing the recording position on the basis of the information as to the recording position where the AV data as material data are recorded. Thus, the virtual file does not include the AV data constituting itself, but is reproduced by referring to the AV data of the normal file in which the AV data are actually recorded.

Now, as described above, since the virtual file does not include AV data constituting itself, if the file (reference destination file) including the AV data referred to by the virtual file is deleted, it becomes difficult to reproduce.

Then, for example, in the foregoing Japanese Patent Application Laid-Open Publication No. 9-163310 or Japanese Patent Application Laid-Open Publication No. 9-284690, the present applicant has proposed a method for, by using a deletable flag or a control flag, preventing the reference destination file from being inadvertently deleted.

That is, the method disclosed in Japanese Patent Application Laid-Open Publication No. 9-163310 or Japanese Patent Application Laid-Open Publication No. 9-284690 uses management information called a record entry to manage a recording area (record) where file data is continuously recorded on a recording medium. The record entry is provided with a deletable flag or control flag. The deletable flag or control flag is used for controlling whether to enable or disable deletion of data recorded in the recording area managed by the record entry. Consequently, the data of the reference destination file referred to by another file (virtual file) are not deleted even if an instruction is issued to delete the reference destination file.

When an instruction to delete a file is issued, however, the method of using such a deletable flag or control flag must search the deletable flag or control flag to determine availability of a virtual file which references the file data. Thus, when a normal file is to be deleted, it is necessary to search all record entries managing the recording area where the file data is recorded, which is troublesome.

DISCLOSURE OF THE INVENTION

The present invention has been made in consideration of the foregoing. It is therefore an object of the present invention to provide a file management device and method thereof, and an audio visual data recording/reproducing device and method thereof for easy file management.

The present invention is characterized in that a file management device for managing a file on a randomly accessible recording medium includes storage means and control means. The storage means stores file management information comprising file entry information and record entry information. The file entry information has an identification name for identifying the file and the number of references indicating the number of other files referencing the file. The record entry information specifies a recording area which continuously records the file on the recording medium. The control means controls the storage means so that the file management information is stored on the storage means. The control means also controls reproduction of a data file containing audio visual data based on the file entry information and the record entry information stored in the storage means.

The present invention is characterized in that a file management method for managing a file on a randomly accessible recording medium comprises a first step and a second step. The first step stores file management information on storage means. The file management information comprises file entry information and record entry information. The file entry information has an identification name for identifying the file and the number of references indicating the number of other files referencing the file. The record entry information specifies a recording area which continuously records the file on the recording medium. The second step reproduces a data file containing audio visual data recorded on the storage medium based on the file management information stored in the first step.

The present invention is characterized in that an audio visual data recording/reproducing device having a randomly accessible recording medium, recording/reproducing means, and a plurality of input/output means includes storage means and control means. The recording/reproducing means records and reproduces data containing audio visual data as a file on the recording medium. A plurality of input/output means outputs the externally input data accessed within a time slot allocated to the recording/reproducing means and inputs the data output from the recording/reproducing means. The storage means stores file management information comprising file entry information and record entry information. The file entry information has an identification name for identifying the file and the number of references indicating the number of other files referencing the file. The record entry information specifies a recording area which continuously records the file on the recording medium. The control means controls the storage means so that the file management information is stored on the storage means when the recording/reproducing means records the file on the recording medium. The control means also controls the recording/reproducing means based on the file management information so that the data is reproduced from the recording medium.

The present invention is characterized in that, with respect to recording/reproducing means for recording and reproducing data containing audio visual data as a file on a randomly accessible recording medium, an audio visual data recording/reproducing method for recording and reproducing the data comprises a first step and a second step. The first step stores file management information comprising file entry information and record entry information on a storage means when the recording/reproducing means stores the data on the recording medium. The second step allows the recording/reproducing means to reproduce a data stored on the recording medium based on the file management information stored by the storage means in the first step. Thereby, the audio visual data recording/reproducing method for recording and reproducing the data outputs the externally input data to the recording/reproducing means by accessing the recording/reproducing means within a time slot to which a plurality of input/output means is allocated and inputs the data output from the recording/reproducing means. The file entry information has an identification name for identifying the file and the number of references indicating the number of other files referencing the file. The record entry information specifies a recording area which continuously records the file on the recording medium.

BRIEF DESCRIPTION OF THE DRAWINGS

FIGS. 2A to 2D illustrate file management information;

FIGS. 3A to 3C explain a file management method;

FIGS. 4A and 4B explain a virtual file;

FIG. 6 illustrates a record entry in which a control flag is placed;

FIGS. 7A and 7B illustrate a file entry for determining whether to enable or disable file deletion according to a VFL link;

FIG. 11 shows a free space byte map;

FIG. 12 shows a free space byte map;

FIGS. 13A and 13B show a free space byte map;

BEST MODE FOR CARRYING OUT THE INVENTION

The best mode for carrying out the invention will be described in detail, with reference to the accompanying drawings.

Figure 1:
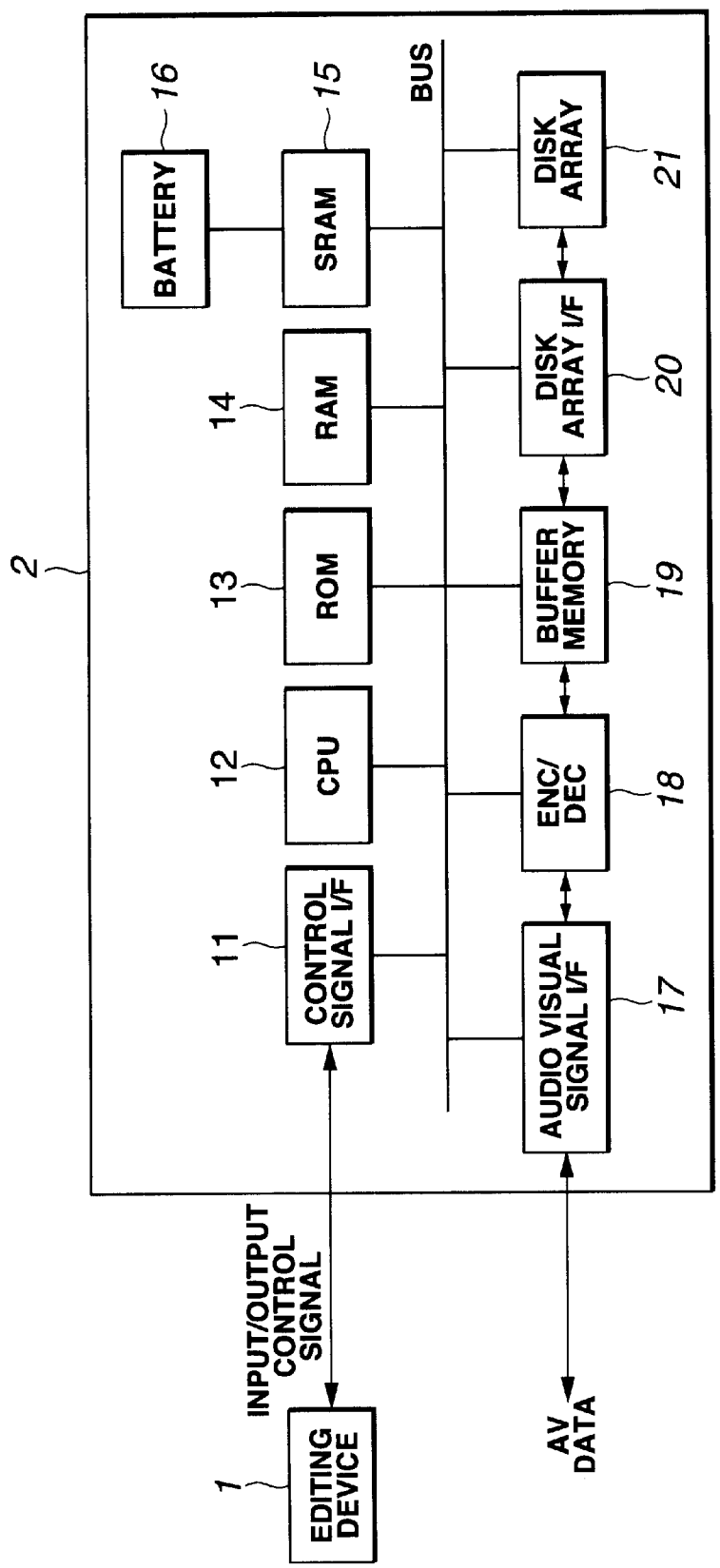
FIG. 1 is a block diagram showing a structural example of an embodiment of a video server system to which the present invention is applied.

FIG. 1 shows a structural example of an embodiment of a video server system to which the invention is applied.

This video server system comprises an editing device 1 and a video server 2.

The editing device 1 is constructed by using, for example, a personal computer or a work station as a base. In accordance with a user operation, the editing device 1 is designed to output input/output signals for giving various instructions, such as recording, reproduction, and editing of AV data, to the video server 2.

The video server 2 is constituted by a control signal I/F (Interface) 11, a CPU (Central Processing Unit) 12, a ROM (Read Only Memory) 13, a RAM (Random Access Memory) 14, an SRAM (Static RAM) 15, a battery 16, an audio visual signal I/F 17, an ENC/DEC (Encoder/Decoder) 18, a buffer memory 19, a disk array I/F 20, and a disk array 21, which are connected to one another through a bus as needed.

The control signal I/F 11 is designed to function as an interface for receiving an input/output control signal from the editing device 1. The input/output control signal received here is supplied to the CPU 12 through the bus.

The CPU 12 is designed to carry out various kinds of processing for controlling individual blocks constituting the video server 2 by executing a control program stored in the ROM 13. The ROM 13 stores the control program which the CPU 12 executes. The RAM 14 is designed to temporarily store data and the like needed for operations of the CPU 12.

The SRAM 15 is designed to store file management information as described later. Incidentally, the SRAM 15 is designed so that power supply is fed from the battery 16. Even if such a state is caused that the power supply of the video server 2 is cut for some reason, the SRAM 15 is designed to be able to hold the storage contents.

The audio visual signal I/F 17 is designed to function as an interface for exchanging digital video data and audio data (AV data) with the outside. That is, the audio visual signal I/F 17 is designed to output the AV data supplied from the ENC/DEC 18 to the outside and to supply the AV data supplied from the outside to the ENC/DEC 18.

The ENC/DEC 18 is designed to encode the AV data supplied from the audio visual signal I/F 17 in accordance with, for example, MPEG (Moving Picture Experts Group) or other systems, and to supply encode data of the AV data obtained consequently to the buffer memory 19. In addition, the ENC/DEC 18 is designed to decode encode data of the AV data stored in the buffer memory 19 in accordance with, for example, the MPEG or the other systems, and to supply decode data of the AV data obtained consequently to the audio visual signal I/F 17.

The buffer memory 19 is designed to temporarily store data supplied from the ENC/DEC 18, the disc array I/F 20, the CPU 12, or the like.

The disk array I/F 20 is designed to function as an interface through which under the control of the CPU 12, the AV data stored in the buffer memory 19 are recorded (stored) in the disk array 21, and the AV data recorded in the disk array 21 are reproduced and are output to the buffer memory 19. The disk array 21 is constructed by, for example, a randomly accessible RAID or the like, and is designed to record the AV data supplied from the disk array I/F 20, and to supply the recorded AV data to the disk array I/F 20.

In the video server system constructed as described above, for example, in the case where the editing device 1 is operated so that when an instruction to record AV data is issued, an input/output control signal indicative of that is supplied from the editing device 1 to the control signal I/F 11 of the video server 2. The control signal I/F 11 outputs the input/output control signal from the editing device 1 to the CPU 12, and by this, control for recording the AV data is carried out in the CPU 12.

That is, in this case, when AV data to be recorded are supplied from the outside to the audio visual signal I/F 17, the AV data are supplied to the ENC/DEC 18. In the ENC/DEC 18, the AV data from the audio visual signal I/F 17 are encoded (compressed), and are supplied to and stored in the buffer memory 19. The AV data stored in the buffer memory 19 are read out by the disk array I/F 20, and are supplied to and recorded in the disk array 21. Further, the CPU 12 causes the SRAM 15 to store information as to the recording position of the AV data as file management information, so that the AV data stored in the disk array 21 can be handled as one file.

Besides, in the case where the editing device 1 is operated so that when an instruction to reproduce the AV data is issued, an input/output control signal indicative of that is supplied from the editing device 1 through the control signal I/F 11 of the video server 2 to the CPU 12. When receiving the input/output control signal from the control signal I/F 11, the CPU 12 carries out a control for reproducing the AV data.

That is, in this case, on the basis of the file management information stored in the SRAM 15, the CPU 12 recognizes the recording position or the like where the AV data of the file to be reproduced are recorded in the disk array 21, and instructs the disk array I/F 20 to read out the AV data from the recording position. In accordance with the instruction of the CPU 12, the disk array I/F 20 reads out the AV data from the disk array 21, and supplies it to the buffer memory 19 to be stored. The AV data stored in the buffer memory 19 are suitably read out and are supplied to the ENC/DEC 18. In the ENC/DEC 18, the AV data are decoded, and are outputted to the outside through the audio visual signal I/F 17.

Next, file management information stored in the SRAM 15 of FIG. 1 will be described.

The file management information is constituted by, for example, as shown in FIG. 2A, K file entries (FEs), L record entries (REs), and M free space list entries (FSLEs).

The file entry is prepared for each file, and as shown in FIG. 2B, a file name (identification name) for identifying the file, link information (link to first RE) for specifying a record entry managing a recording area where the first data of the file are continuously recorded, and the like are placed there.

The record entry is prepared for each recording area where data constituting a file are continuously recorded, and as shown in FIG. 2C, a head position (head position data) (for example, sector address) of a recording area where data of the file are continuously recorded in the disk array 21, and the size of the recording area (recording length of continuous area) (for example, sector length) are placed there. Further, in the record entry, link information (link to next RE) for specifying a record entry as to a recording area where next data of the file are continuously recorded is also placed.

That is, in the randomly accessible disk array 21, all data of one file are not necessarily recorded in continuous recording areas, but can be recorded at intervals in some recording areas. Then, in the record entry, the link to the next RE for specifying the record entry as to the recording area where the next data of the file are continuously recorded is also placed.

Incidentally, in the case where there is no recording area where next data are continuously recorded, that is, in the case where data of the file are ended in a recording area managed by some record entry, EOR (End Of RE) is written in the next "link to RE" of the record entry.

Besides, in the case of the above, although the recording area is specified by the position of the head of the recording area and the size of the recording area, it is also possible to specify the recording area by another way, for example, the position of the head and the position of the end, and the like.

The free space list entry is prepared for each continuous free area, and as shown in FIG. 2D, a head position (head position data) of a continuous free area in the disk array 21, the size of the free area (recording length of continuous area), and link information (link to next FSLE) for specifying a free space list entry as to a next free area are placed there.

According to the file management information as described above, a file recorded in the disk array 21 is managed as described below.

That is, it is assumed that in the disk array 21, data of a file having file name A are recorded in, for example, as shown in FIG. 3A, a recording area of addresses (sector addresses) 51 to 100, a recording area of 201 to 300, and a recording area of 501 to 750 in this sequence.

In this case, a file entry and a record entry as to the file A become as shown in FIG. 3B. That is, A is placed in the file name of a file entry FE#A as to the file A. Link information for specifying a record entry RE#1 managing the recording area of addresses 51 to 100 is placed in the link to first RE. The record entry RE#1 is provided with the address 51 indicating the head position of the recording area of addresses 51 to 100, the address 50 indicating the size of the recording area, and link information for specifying a record entry RE#2 which manages the recording area of addresses 201 to 300 where next data are recorded. Further, the record entry RE#2 is provided with the address 201 indicating the head position of the recording area of addresses 201 to 300, the address 100 indicating the size of the recording area, and link information for specifying a record entry RE#3 which manages the recording area of addresses 501 to 750 where next data are recorded.

The record entry RE#3 is provided with the address 501 indicating the head position of the recording area of addresses 501 to 750, and the address 250 indicating the size of the recording. Since the recording area of addresses 501 to 750 is the last area where data of the file A are recorded, the record entry RE#3 is provided with EOR instead of link information for specifying a record entry which manages a recording area where next data are recorded.

According to the file entry FE#A and the record entries RE#1 to RE#3 as described above, the file A is reproduced in the manner described below.

That is, in the case where an instruction to reproduce the file A is issued, the file entry FE#A having the file name of A is searched, and on the basis of the file entry FE#A, the record entry RE#1 managing the recording area where the first data of the file A are recorded is searched. Furthermore, on the basis of the record entry RE#1, the record entry RE#2 managing the recording area where next data are recorded is searched, and on the basis of the record entry RE#2, the record entry RE#3 managing the recording area where further next data are recorded is searched. Then, since the EOR is placed in the record entry RE#3, the search for record entries is ended there.

On the other hand, as described above, since the record entries RE#1 to #3 are sequentially searched, it is understood that in the disk array 2 1, the data of the file A are recorded as shown in FIG. 3A in the recording area of addresses 51 to 100, the recording area of addresses 201 to 300, and the recording area of addresses 501 to 750 in this sequence. Thus, by sequentially reading out the data recorded in these recording areas, the data of the file A can be reproduced.

As described above, according to the file entry and the record entry, although the recording area where data are recorded can be recognized, it is necessary to recognize a free area in order to record data in the disk array 21. The free space list entry is used when this free area is recognized.

For example, in the case shown in FIG. 3A, provided that anything other than the data of the file A is not recorded, in the disk array 21, the recording area of addresses 1 to 50, the recording area of addresses 101 to 200, and the recording area of addresses 301 to 500 are free areas.

In this case, the free space list entry as to the disk array 21 becomes as shown in FIG. 3C.

That is, a free space list entry FSLE#1 manages the recording area of addresses 1 to 50 of the first free area of the disk array 21. The FSLE#1 contains the address 1 indicating the head position of the free area of addresses 1 to 50, 50 indicating the size of the free area, and link information for specifying a free space list entry FSLE#2 managing the recording area of addresses 101 to 200 as the next free area.

The free space list entry FSLE#2 contains the address 101 indicating the head position of the free space of addresses 101 to 200, 100 indicating the size of the free area, and link information for specifying a free space list-entry FSLE#3 managing the recording area of addresses 301 to 500 as the next free area.

The free space list entry FSLE#3 contains the address 301 indicating the head position of the free area of addresses 301 to 500, and 200 indicating the size of the free area. Since the free area of addresses 301 to 500 is the last free area in the disk array 21, the free space list entry FSLE#3 is provided with EOF (End Of FSLE) indicating that it is the last free space list, instead of link information for specifying a free space list entry managing a next free area.

In the case where a file is recorded, on the basis of a free space list entry as described above, a free area of the disk array 21 is recognized, and a recording area necessary for recording the file is ensured in the free area. Then, a file entry and a record entry as to the file to be recorded are prepared, and the data are written into the ensured recording area. Further, in accordance with the free area after the data are written, the free space list entry is changed.

Incidentally, the details of a file system, as described above, for carrying out management of a file by using the file entry, the record entry, and the free space list entry as file management information are disclosed in, for example, Japanese Patent Application Laid-Open Publication No. 9-163310 proposed by the present applicant, and the like.

Next, in the case where edition is made using AV data as material data recorded in the disk array 21 of FIG. 1, the user operates the editing device 1, so that the material data recorded in the disk array 21 are reproduced in the manner as described above. The user inputs a start point (so-called IN point) and an end point (so-called OUT point) while seeing monitor output or the like of the material data. By repeating such an operation, one or more cuts used as the result of editing are specified.

In this case, the editing device 1 transmits, as data for a single cut, the file name of the material data, the start point, and the end point, instead of the material data itself constituting the cut used as the editing result, to the video server 2. Here, the data of one cut made of the file name, the start point, and the end point will be hereinafter suitably referred to as VFL (Virtual File) data.

For example, now, it is assumed that a file A recorded in the disk array 21 is reproduced, and in terms of address of the recording area of the disk array 21, the position apart from the head position of the file A by 11 or 60 is specified as the start point or end point. In this case, from the editing device 1 to the video server 2, as shown in FIG. 4A, the file name A of the material data, the start point 11, and the end point 60 are transmitted as the VFL data of one cut.

In this case, when it is assumed that the AV data of the file A are recorded in the disk array 21, for example, as shown in the foregoing FIG. 3A, according to the VFL data of one cut of the file name A, the start point 11, and the end point 60, as shown in FIG. 4B, it is possible to specify the AV data for 40 addresses from address 61 (=51+11−1) to 100 recorded in the recording area of addresses 51 to 100 of the disk array 21, and the AV data for 10 addresses (=60−11+ 1−40) from address 201 recorded in the recording area of addresses 201 to 300, that is, the AV data from address 201 to address 210.

Thus, in the case where material data recorded in the disk array 21 are edited, since AV data as an edit result can be specified by the file name, the start point, and the end point as mentioned above and by using the original material data, it is not necessary to newly record the AV data themselves as the edit result. That is, since the AV data constituting the file as the edit result have been already recorded as the AV data of the other file, the file as the edit result can be constituted by referring to the already recorded AV data of the other file.

Like this, although the file constituted by referring to the other file does not include its own written AV data, so to speak, as an entity, it is seen by the user as a file including AV data as an entity. Then, such a file is referred to as a virtual file (VFL). Besides, a file referred to by a virtual file is hereinafter suitably called a reference file (reference destination file).

Since the virtual file is also a file, when the virtual file is recorded, its file entry and record entry are prepared.

Figures 5A, 5B:
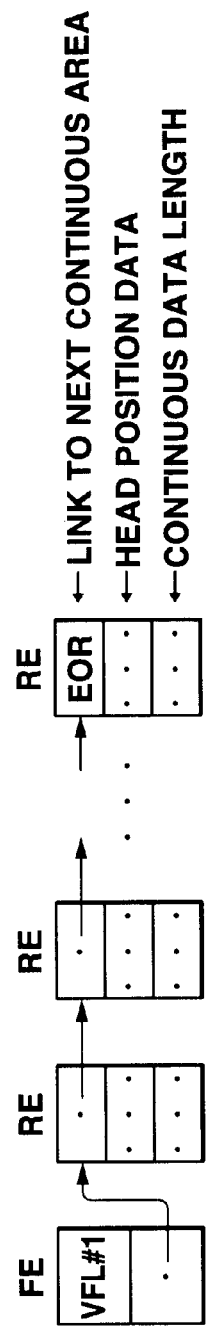
FIGS. 5A and 5B explain VFL data for preparing a virtual file, and a file entry and a record entry of the virtual file.

That is, for example, in the case where a virtual file constituted by a continuous scene of N cuts is edited, as shown in FIG. 5A, VFL data of the N cuts are transmitted from the editing device 1 to the video server 2. In this case, as shown in FIG. 5B, a file entry (FE) of the virtual file as the edit result is prepared (in FIG. 5B, a file name of the virtual file is VFL#1). In addition, a record entry (RE) is prepared for every recording area where AV data of the file specified by the VFL data of each cut are continuously recorded.

Thus, reproduction of a virtual file can be made in the same manner as a normal file (file including AV data as an entity).

Incidentally, as described above, if a reference file referred to by a virtual file is deleted, it becomes impossible to reproduce the virtual file. Then, in Japanese Patent Application Laid-Open Publication No. 9-163310 and No. 9-284690, the present applicant has proposed a method for prohibiting deletion of AV data of a file as a reference file by arranging a control flag (or a deletable flag) in a record entry as shown in FIG. 6.

However, according to this method, it is necessary to search all record entries managing the recording areas where the AV data of the file as the reference file are recorded, which is troublesome.

Then, in the server 2 of FIG. 1, a file entry as shown in FIG. 7 is prepared. That is. FIG. 7A shows a file entry of a virtual file. FIG. 7B shows a file entry of a reference file.

In the file entry (FIG. 7A) of the virtual file, in the case shown in FIG. 2B, a file name of a reference file to which the virtual file refers is placed. In the file entry of the reference file (FIG. 7B), in the case shown in FIG. 2B, further, the number of virtual files referring to the reference file (link number by VFL) (hereinafter, suitably, referred to as VFL link) is placed.

Incidentally, it is also possible to prepare a new virtual file by using not a normal file but a virtual file as a reference file, and accordingly, as shown in FIG. 7A, a VFL link is placed also in a file entry of a virtual file similarly to a file entry of a reference file.

Figure 8:
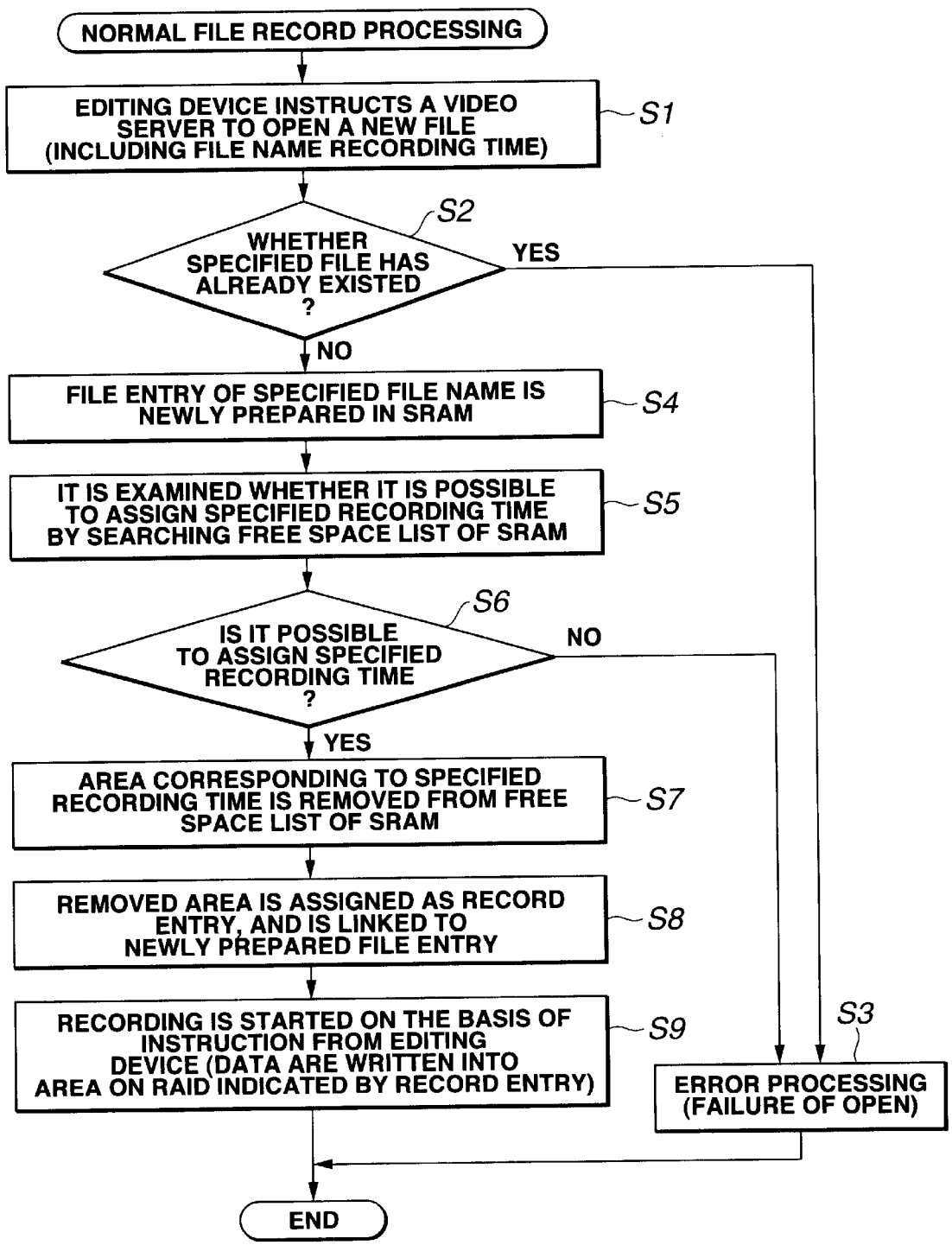
FIG. 8 is a flowchart for explaining record processing of a normal file.

Next, with reference to a flowchart in FIG. 8, the following describes record processing for recording a normal file (file not a virtual file) in the case where the file management information is constituted by the file entry in FIG. 1, the record entry in FIG. 2C, and the free space list entry in FIG. 2D.

When the editing device 1 is operated to record AV data, at step S1, the editing device 1 transmits a command (hereinafter suitably referred to as an open command) indicating opening of a new file, together with necessary information such as a file name of the new file and a recording time, to the video server 2.

This open command is received by the CPU 12 through the control signal I/F 11. At step S2, the CPU 12 refers to the file management information (file entry) stored in the SRAM 15, and judges whether a file having the same file name as the file name transmitted together with the open command has already existed (recorded in the disk array 21).

At step S2, in the case where it is judged that a file having the same file name as the file name transmitted together with the open command has already existed, the procedure proceeds to step S3. The CPU 12 performs error processing such as transmitting to the editing device 1 a message indicating that a new file cannot be opened and terminates the record processing.

At step S2, in the case where it is judged that a file having the same file name as the file name transmitted together with the open command does not exist, the procedure proceeds to step S4. In the CPU 12, a file entry in which the file name is placed is prepared, and is supplied to and stored in the SRAM 15.

Further, at step S5, the CPU 12 refers to the free space list entry stored in the SRAM 15 to recognize a free area, and the procedure proceeds to step S6. At step S6, the CPU 12 judges whether it is possible to make a record operation corresponding to the recording time transmitted together with the open command, that is, whether a free space capable of recording data having the recording time exists in the disk array 21.

At step S6, in the case where it is judged that it is impossible to make a record operation corresponding to the recording time transmitted together with the open command, that is, in the case where there is no free area corresponding to the recording time, the procedure proceeds to step S3. Error processing as described above is carried out, and the record processing is ended. Incidentally, in this case, processing to delete the file entry prepared at step S4 from the SRAM 15 is also carried out.

At step S6, in the case where it is judged that it is possible to make a recording operation corresponding to the recording time transmitted together with the open command, the procedure proceeds to step S7. A free area corresponding to the recording time is ensured. The free space list entry stored in the SRAM 15 is deleted or changed in accordance with the ensured free area.

Then, the procedure proceeds to step S8. A record entry is prepared for every continuous recording area in the ensured free area and is stored in the SRAM 15. Further, at step S8, link information for specifying a record entry to manage a recording area where first data are recorded is placed in the file entry prepared at step S4. That is, a record entry to manage a recording area where first data are recorded is linked in the file entry prepared at step S4. The procedure proceeds to step S9.

At step S9, AV data are supplied through the audio visual signal I/F 17, the ENC/DEC 18, the buffer memory 19, and the disk array I/F 20. The AV data are recorded in the recording area of the disk array 21 managed by the record entries prepared at step S8 in the order of record entries linked. The record processing is then ended.

Incidentally, immediately after the normal file is recorded in the manner as described above, a virtual file referring to the file does not exist. Because of this, zero is assumed for the VFL link of the file entry prepared at step S4. The VFL link is the number of virtual files referring to the file, or the link number by VFL in FIG. 7B.

Figure 9:
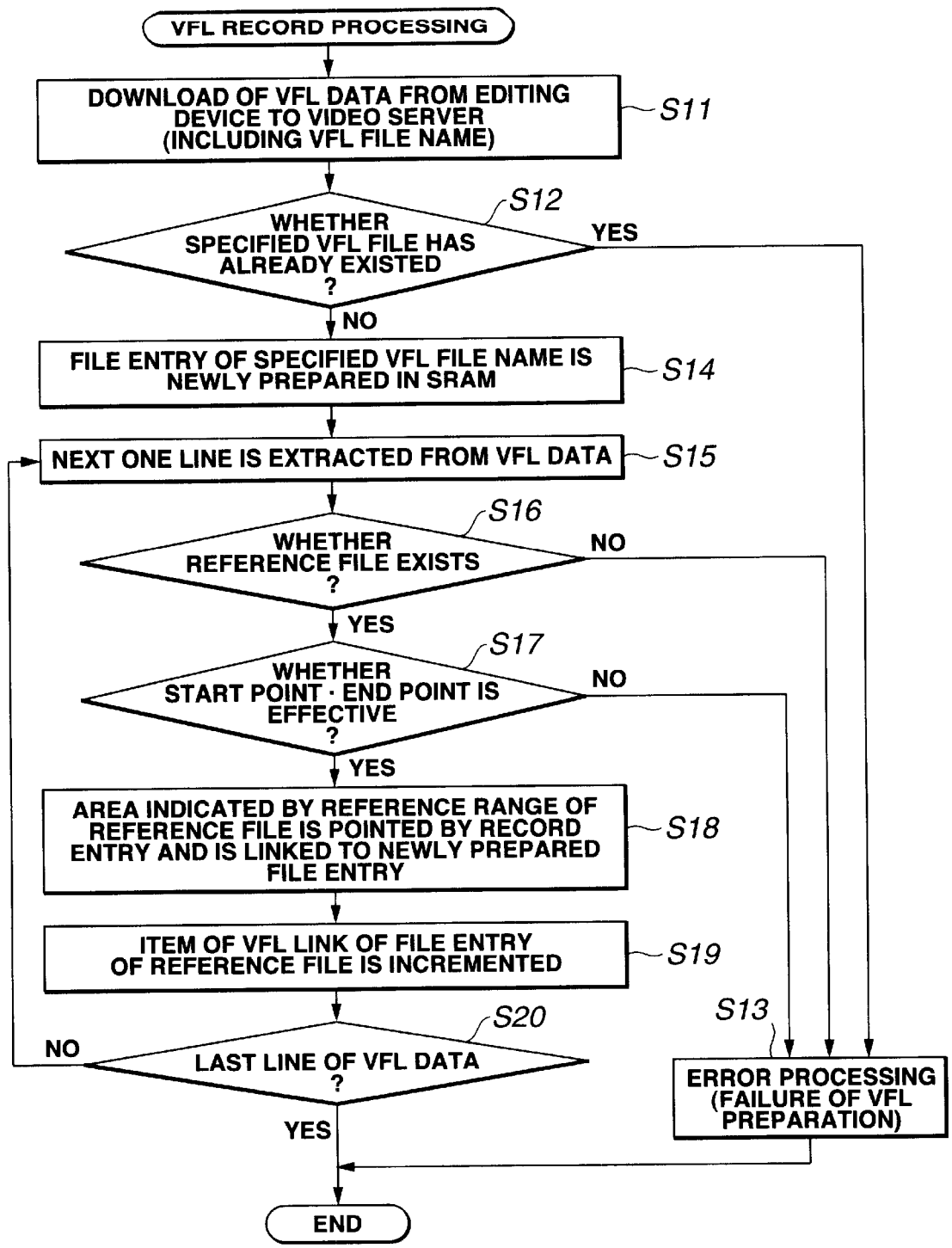
FIG. 9 is a flowchart for explaining record processing of a virtual file.

Next, with reference to a flowchart of FIG. 9, a description will be made on record processing for recording a virtual file in the case where file management information is constituted by the file entry in FIG. 7, the record entry in FIG. 2C, and the free space list entry in FIG. 2D.

The user operates the editing device 1 and repeats an operation of specifying a start point and an end point of a reference file for a necessary number of times. When VFL data as shown in FIG. 5A are prepared by this, at step S11, the VFL data are transmitted from the editing device 1 to the server 2 together with the file name of the virtual file to be recorded. The VFL data are received by the CPU 12 through the control signal I/F 11. At step S12, the CPU 12 refers to the file management information (file entry) stored in the SRAM 15. By doing this, the CPU 12 determines whether a file having the same file name as the file name transmitted together with the VFL data has already existed (been recorded in the disk array 21).

At step S12, in the case where it is judged that a file having the same file name as the file name transmitted together with the VFL data has already existed, the procedure proceeds to step S13. The CPU 12 performs error processing such as transmitting to the editing device 1 a message indicating that a new (virtual) file cannot be opened and terminates the record processing.

At step S12, in the case where it is judged that a file having the same file name as the file name transmitted together with the VFL data does not exist, the procedure proceeds to step S14. The CPU 12 creates a file entry in which the file name is placed. That is, the CPU 12 creates the file entry (FIG. 7A) which is provided with the file name transmitted together with the VFL data and the file name of the reference file contained in the VFL data.

Then, at step S15, the CPU 12 extracts the first line of the VFL data as marked VFL data. The CPU 12 then proceeds to step S16 and refers to the file management information stored in the SRAM 15. By doing this, the CPU 12 judges whether the disk array 21 records a file having the same file name as the file name of the reference file in the marked VFL data. That is, the CPU 12 judges whether the reference file exists.

At step S16, in the case where it is judged that the reference file does not exist, that is, in the case where the disk array 21 does not record the file specified by the file name in the marked VFL data, the procedure proceeds to step S13. The error processing as described above is carried out, and the record processing is ended. Incidentally, in this case, processing to delete the file entry prepared at step S14 from the SRAM 15 is also carried out.

At step S16, in the case where it is judged that the reference file exists, the procedure proceeds to step S17. The CPU 12 judges whether the start point and the end point in the marked VFL data are effective.

At step S17, there may be the case where the CPU 12 determines that the start point and the end point in the marked VFL data are not effective. That is, there may be the case where, for example, AV data of the reference file specified by the file name in the marked VFL data are not recorded at the recording position of the disk array 21 specified by the start point and the end point in the marked VFL data. In this case, the procedure proceeds to step S13. The error processing as described above is carried out, and the record processing is ended. Incidentally, in this case, processing to delete the file entry prepared at step S14 from the SRAM 15 is also carried out.

At step S17, there may be the case where the CPU 12 determines that the start point and the end point in the marked VFL data are effective. That is, there may be the case where, for example, AV data specified by the start point and the end point in the marked VFL data belong to the reference file specified by the file name in the marked VFL data. In this case, the procedure proceeds to step S18. A record entry is prepared for every continuous recording area where AV data of the reference file specified by the marked VFL data are recorded, and is stored in the SRAM 15.

Incidentally, there may be the case where the marked VFL data belong to the first line of the VFL data transmitted from the editing device 1. In this case, at step S18, the file entry prepared at step S14 is also provided with link information for specifying a record entry managing a recording area where the first AV data of the virtual file are recorded.

Thereafter, the procedure proceeds to step S19. In the CPU 12, the file entry of the reference file specified by the file name in the marked VFL data is searched from the SRAM 15. The VFL link placed in the file entry is incremented by, for example, one. Then, the procedure proceeds to step S20. It is judged whether the marked VFL data belong to the final line of the VFL data transmitted from the editing device 1.

At step S20, there may be the case where it is judged that the marked VFL data do not belong to the final line of the VFL data transmitted from the editing device 1. Namely, there may be the case where data which have not been made marked VFL data exist in the VFL data transmitted from the editing device 1. In this case, the procedure returns to step S15. VFL data at the next line of the current marked VFL data are newly extracted as marked VFL data. The processing subsequent to step S16 is repeated.

On the other hand, at step S20, there may be the case where it is judged that the marked VFL data do not belong to the final line of the VFL data transmitted from the editing device 1. That is, there may be the case where data which have not been made marked VFL data do not exist in the VFL data transmitted from the editing device 1. In this case, the record processing is ended.

Incidentally, immediately after the virtual file is recorded in the manner as described above, there is no virtual file referring to the virtual file. Because of this, zero is assumed for the VFL link of the file entry prepared at step S14. The VFL link is the number of virtual files referring to the file, or the link number by VFL in FIG. 7A.

Figure 10:
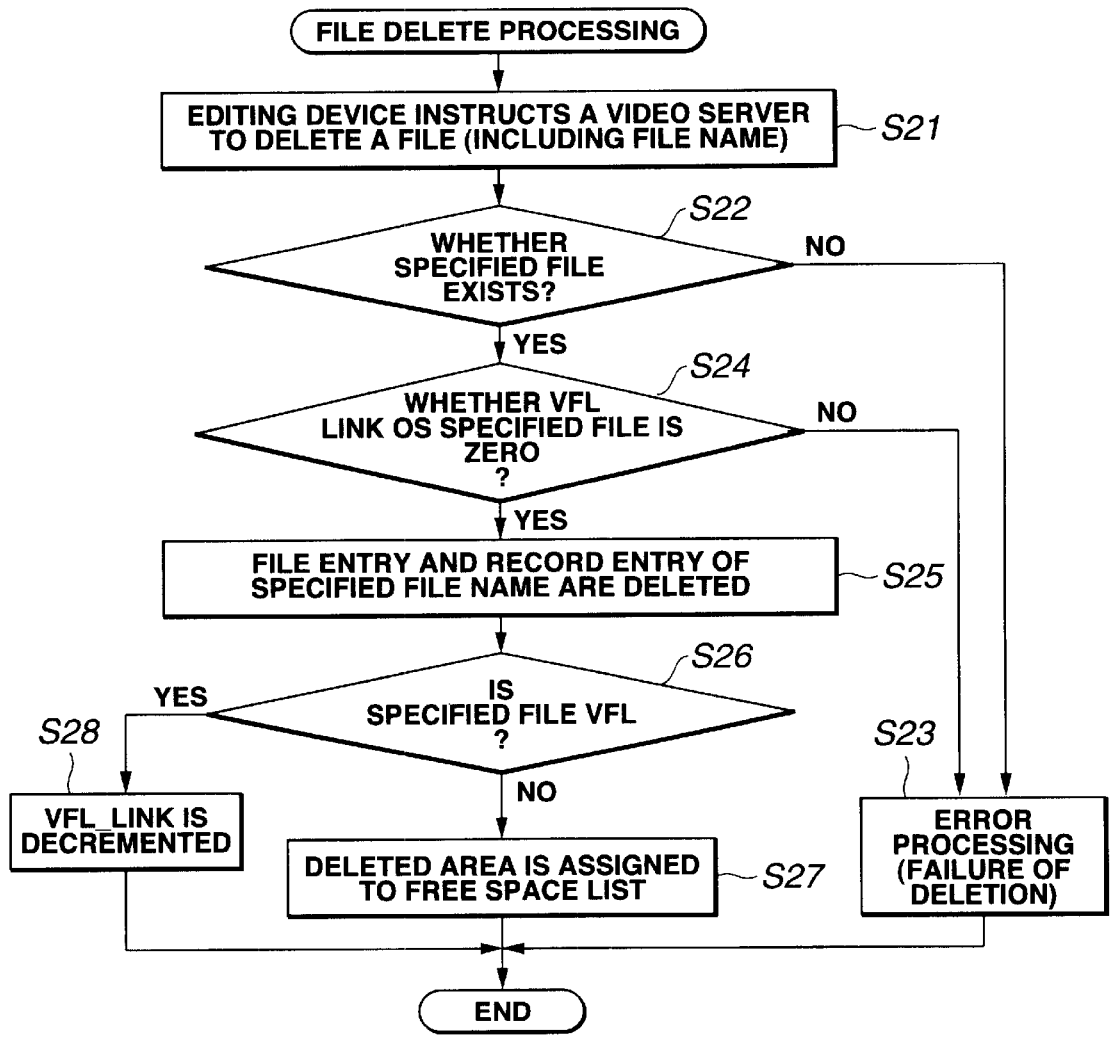
FIG. 10 is a flow chart for explaining delete processing of a file.

Next, with reference to a flowchart of FIG. 10, a description will be made on delete processing to delete a file in the case where file management information is constituted by the file entry in FIG. 7, the record entry in FIG. 2C, and the free space list entry in FIG. 2D.

There may be the case where the editing device 1 is operated so as to make deletion of a file. In this case, at step S21, the editing device 1 transmits to the video server 2 a command (hereinafter suitably referred to as a delete command) indicating deletion of the file. This command is transmitted together with necessary information such as a file name of the file to be deleted.

The CPU 12 receives this delete command through the control signal I/F 11. At step S22, the CPU 12 refers to the file management information (file entry) stored in the SRAM 15. By doing this, the CPU 12 judges whether a file having the file name transmitted together with the delete command exists (is recorded in the disk array 21).

At step S22, in the case where it is judged that a file having the file name transmitted together with the delete command does not exist, the procedure proceeds to step S33. The CPU 12 performs error processing such as transmitting to the editing device 1 a message which indicates that the file cannot be deleted. The CPU 12 then terminates the delete processing.

Besides, at step S22, in the case where it is judged that there exists a file (hereinafter suitably referred to as a delete object file) having the file name transmitted together with the delete command, the procedure proceeds to step S24. The CPU 12 judges whether the VFL link placed in the file entry of the delete object file is zero.

At step S24, there may be the case where it is judged that the VFL link placed in the file entry of the delete object file is not zero. That is, there may be the case where there exists a virtual file referring to the delete object file. In this case, the procedure proceeds to step S33. The error processing as described above is carried out, and the delete processing is ended.

At step S24, there may be the case where it is judged that the VFL link placed in the file entry of the delete object file is zero. That is, there may be the case where there exists no virtual file referring to the delete object file. In this case, the procedure proceeds to step S25. The CPU 12 deletes the file entry and the record entry of the delete object file from the SRAM 15.

Then, the procedure proceeds to step S26. The CPU 12 judges whether the delete object file is a virtual file referring to other files.

At step S26, in the case where it is judged that the delete object file is not a virtual file, the procedure proceeds to step S27. The CPU 12 changes the free space list entry stored in the SRAM 15 so as to add the recording area managed by the record entry deleted at step S25 as a free area. The CPU 12 then terminates the delete processing.

At step S26, in the case where it is judged that the delete object file is a virtual file, the procedure proceeds to step S28. The CPU 12 decrements by one the VFL link placed in the file entry as to the reference file whose file name is described in the file entry of the virtual file. The CPU 12 then terminates the delete processing. Incidentally, when the delete object file is a virtual file, AV data as the entity of the virtual file do not exist. Even if such a virtual file is deleted, no free area is generated in the disk array 21. Accordingly, no changes are made to free space list entries. As described above, the file entry is provided with the VFL link indicating the number of other files referring to the file. Because of this, it is possible to easily judge whether the file may be deleted just by referring to the file entry of the file instructed to be deleted. Consequently, it becomes possible to make file management easy.

By the way, as described above, when the VFL link is placed in the file entry, it is possible to easily judge whether the file may be deleted. In this case, however, it becomes impossible to delete the whole of the file in which the VFL link is not zero, that is, which is referred to by another file.

Thus, for example, it becomes impossible to delete a file made of a large amount of AV data if a slight portion of the AV data is referred to by another file. Namely, when a small portion of AV data is referenced in a file which comprises a large amount of AV data, it is impossible to delete most AV data which is not referenced. This is not preferable in view of an effective use of the recording area in the disk array 21.

Although this problem can be solved by separately recording (copying) the referenced AV data, it loses the meaning of adopting the virtual file.

Then, as file management information, a free space byte map (reference number table) as shown in FIG. 11 is adopted in addition to the file entry in FIG. 2B and the record entry in FIG. 2C.

The recording area of the disk array 21 is logically divided into units called clusters. The free space byte map is constituted by columns (hereinafter suitably referred to as cluster entries) which contain the number of files (reference number) referring to the respective clusters. Here, a sector is a physical minimum unit of the recording area of the disk array 21. The cluster is a logical minimum unit. Accordingly, the cluster is constituted by a collection of one or more sectors.

For example, it is assumed that the recording area of the disk array 21 is divided into 120 equal parts (in general, more finely divided) to constitute clusters. The free space byte map comprises 120 cluster entries respectively corresponding to 120 clusters as shown in FIG. 11.

Incidentally, the cluster entry comprises, say, 1 byte (8 bits). In this case, the cluster entry makes it possible to count a reference number up to 255. Each cluster can be referred to by 255 (=2⁸−1) files at the maximum.

Besides, logical numbers 000 to 119 are assigned to individual 120 clusters in an ascending order of sector addresses. The n-th cluster from the head is depicted as cluster #n−1. Similarly, a cluster entry for managing the cluster #n−1 is depicted as cluster entry #n−1. Incidentally, in the free space byte map of FIG. 11, it is assumed that a cluster entry number increases from the left to right, and from the top to bottom in the cluster entries. In FIG. 11, the number of a cluster entry can be obtained by adding a numeral affixed to the row for the cluster entry (numeral affixed on the margin of the free space byte map in FIG. 11) to a numeral affixed to its column. The same applies to FIGS. 12 and 13 described later.

When no files are recorded in the disk array 21, there exists no file referring to the cluster. Accordingly, the reference number of every cluster entry is zero as shown in FIG. 11.

In the disk array 21, for example, it is assumed that AV data of given file FILE#1 are recorded in recording areas which are lightly shaded in FIG. 12. The reference number of each cluster entry of the free space byte map becomes as shown in the drawing. That is, in FIG. 12, the AV data are recorded in three continuous recording areas of clusters #000 to #023, #045 to #067, and #089 to #104. At this point, these clusters are referred to by only the file FILE#1. The reference number 0 or 1 is assumed for each of the cluster entries #000 to #023, #045 to #067, and #089 to #104 managing those clusters.

Since the cluster comprises a collection of at least one sector, there is the case where the AV data are recorded in only a part thereof. For example, in FIG. 12, with respect to the clusters #023, #045, #089, #104, the AV data are recorded on only its partial sector.

Next, as shown in FIG. 12, after the AV data of the file FILE#1 are recorded, it is assumed that a virtual file VFL#1 is prepared by connecting AV data of recording areas which are darkly shaded in FIG. 13A among the AV data. In this case, the reference number of each cluster entry of the free space byte map becomes as shown in FIG. 13A. That is, in FIG. 13A, the virtual file VFL#1 is constituted by referring to the AV data recorded in three continuous recording areas of clusters #012 to #025, #054, #055, and #090 to #097. The reference number for each of the cluster entries #012 to #025, #054, #055, #090 to #097 managing those clusters is incremented by 1 and becomes 1 or 2.

Thereafter, when an instruction to delete the file FILE#1 is issued, the number of files referring to the clusters #000 to #023, #045 to #067, #089 to #104 where data of the FILE #1 are recorded is decreased by the file FILE#1, that is, 1. Thus, the reference number of each of the cluster entries #000 to #023, #045 to #067, #089 to #104 managing these clusters is decremented by 1. Consequently, the free space byte map becomes as shown in FIG. 13B from FIG. 13A.

That is, as described above, the reference number is decremented by 1. As shown in FIG. 13B, among the clusters #000 to #023, #045 to #067, #089 to #104 where the FILE #1 was recorded, the reference number 1 is assumed for each of the cluster entries #012 to #025, #054, #055, #090 to #097 managing the clusters #012 to #025, #054, #055, #090 to #097 where the AV data referred to by the virtual file VFL#1 are recorded. The reference number for the other cluster entries becomes 0.

Thus, there is no problem even if a cluster managed by a cluster entry having the reference number 0 is released as a free area. That is, in FIG. 13B, clusters which record the AV data referred to by the virtual file VFL#1 are the clusters #012 to #025, #054, #055, #090 to #097 managed by the cluster entries having the reference number 1. Even if the AV data is deleted from the file FILE#1 recorded in clusters except these, it is still possible to reproduce the virtual file VFL#1. As a result, it becomes possible to effectively use the recording areas of the disk array 21.

That is, there may be the case where the free space list entry (FIG. 2D) is used for managing the free area and the VFL link is used for determining whether to allow or disallow deletion of a file. In this case, reference to a small amount of AV data in a file from a virtual file disables deletion of the entire AV data for the file. On the other hand, as described above, when the free space byte map is used for managing the reference number of files referring to a cluster, deletion of AV data becomes possible on a cluster basis. Accordingly, it becomes possible to delete AV data not referenced in the file which the virtual file references. As a result, it is possible to prevent the recording areas of the disk array 21 from being occupied by such, so to speak, unnecessary AV data.

Figure 14:
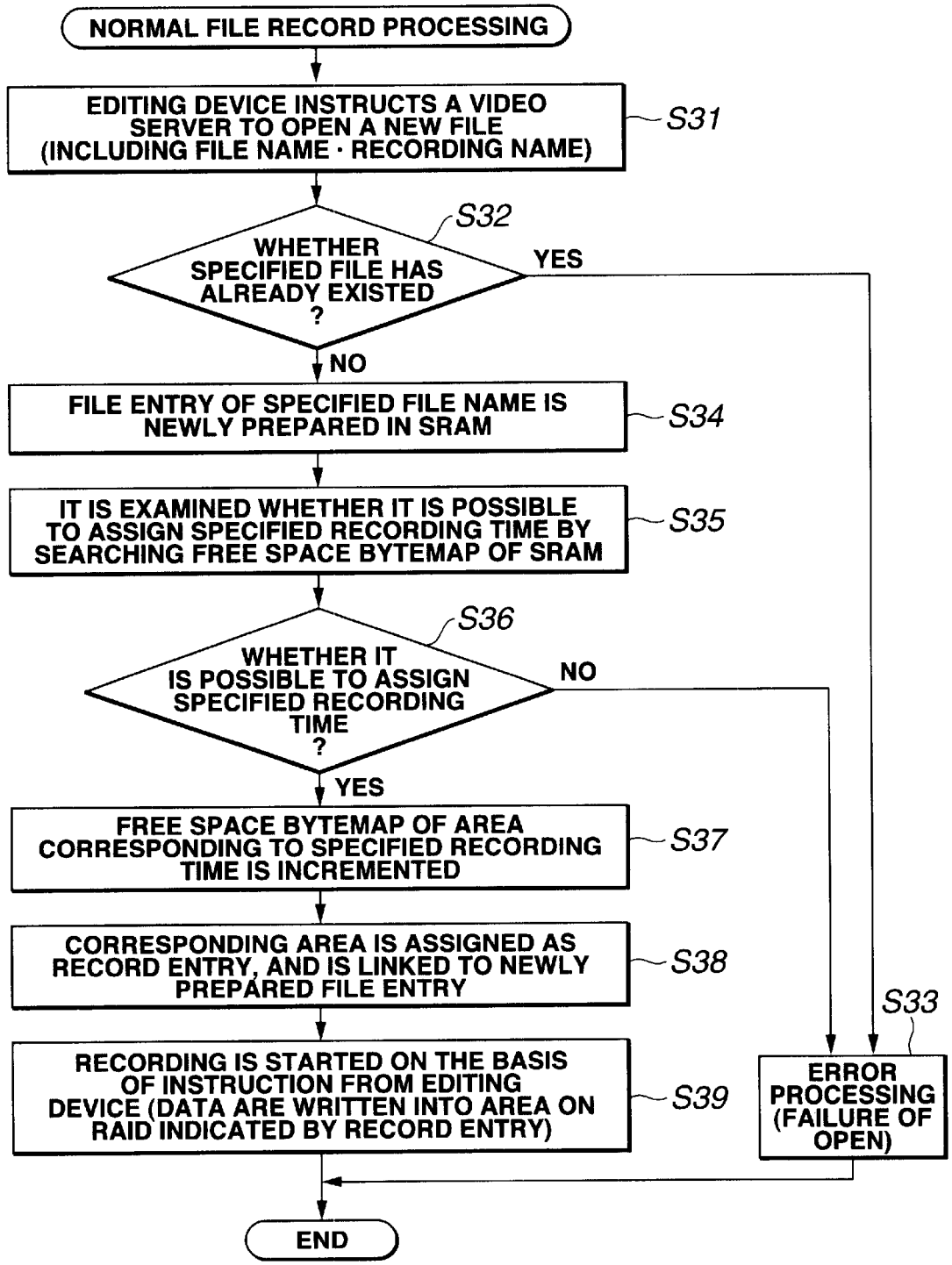
FIG. 14 is a flowchart for explaining record processing of a normal file.

Next, with reference to a flowchart of FIG. 14, a description will be made on record processing of recording a normal file in the case where file management information is constituted by the file entry in FIG. 2B, the record entry in FIG. 2C, and the free space byte map in FIG. 11.

There may be the case where the editing device 1 is operated so as to record AV data. In this case, at step S21, like step S1 in FIG. 8, the editing device 1 transmits an open command to the video server 2. This command is transmitted together with necessary information such as a file name and a recording time of a file to be opened.

This open command is received by the CPU 12 through the control signal I/F 11. At step S32, the CPU 12 refers to the file management information (file entry) stored in the SRAM 15. By doing this, the CPU 12 determines whether a file having the same file name as the file name transmitted together with the open command has already existed (been recorded in the disk array 21).

At step S32, in the case where it is judged that the file having the same file name as the file name transmitted together with the open command has already existed, the procedure proceeds to step S33. The CPU 12 performs error processing such as transmitting to the editing device 1 a message indicating that a new file cannot be opened and terminates the record processing.

At step S32, in the case where it is judged that the file having the same file name as the file name transmitted together with the open command does not exist, the procedure proceeds to step S34. In the CPU 12, a file entry in which the file name is placed is prepared, and is supplied to and stored in the SRAM 15.

Further, at step S35, the CPU 12 refers to the free space byte map stored in the SRAM 15. On the basis of a cluster entry where its reference number is 0, the CPU 12 recognizes a free area, and proceeds to step S36. At step S36, the CPU 12 judges whether it is possible to make a record operation corresponding to the recording time transmitted together with the open command. That is, the CPU 12 judges whether a free area capable of recording the data corresponding to the recording time exists in the disk array 21.

At step S36, there may be the case where it is judged that it is impossible to make a record operation corresponding to the recording time transmitted together with the open command. That is, there may be the case where no free area is available corresponding to the recording time. In this case, the procedure proceeds to step S33, the error processing as described above is carried out, and the record processing is ended. Incidentally, in this case, processing to delete the file entry prepared at step S34 from the SRAM 15 is also carried out.

At step S36, in the case where it is judged that it is possible to make a recording operation corresponding to the recording time transmitted together with the open command, the procedure proceeds to step S37. A free area corresponding to the recording time is ensured. The reference number is incremented by 1 for a cluster entry managing a cluster including the ensured free area among cluster entries of the free space byte map stored in the SRAM 15.

Then, the procedure proceeds to step S38. A record entry is prepared for each continuous recording area of the ensured free area, and is stored in the SRAM 15. Further, at step S38, link information for specifying a record entry managing the recording area which records first data is placed in the file entry prepared at step S34, That is, the record entry managing the recording area which records the first data is linked with the file entry prepared at step S34. The procedure then proceeds to step S39.

At step S39, AV data are supplied through the audio visual signal I/F 17, the ENC/DEC 18, the buffer memory 19, and the disk array I/F 20. The AV data are recorded in the recording area of the disk array 21 managed by the record entries prepared at step S38 in the order of record entries linked. The record processing is then ended.

Figure 15:
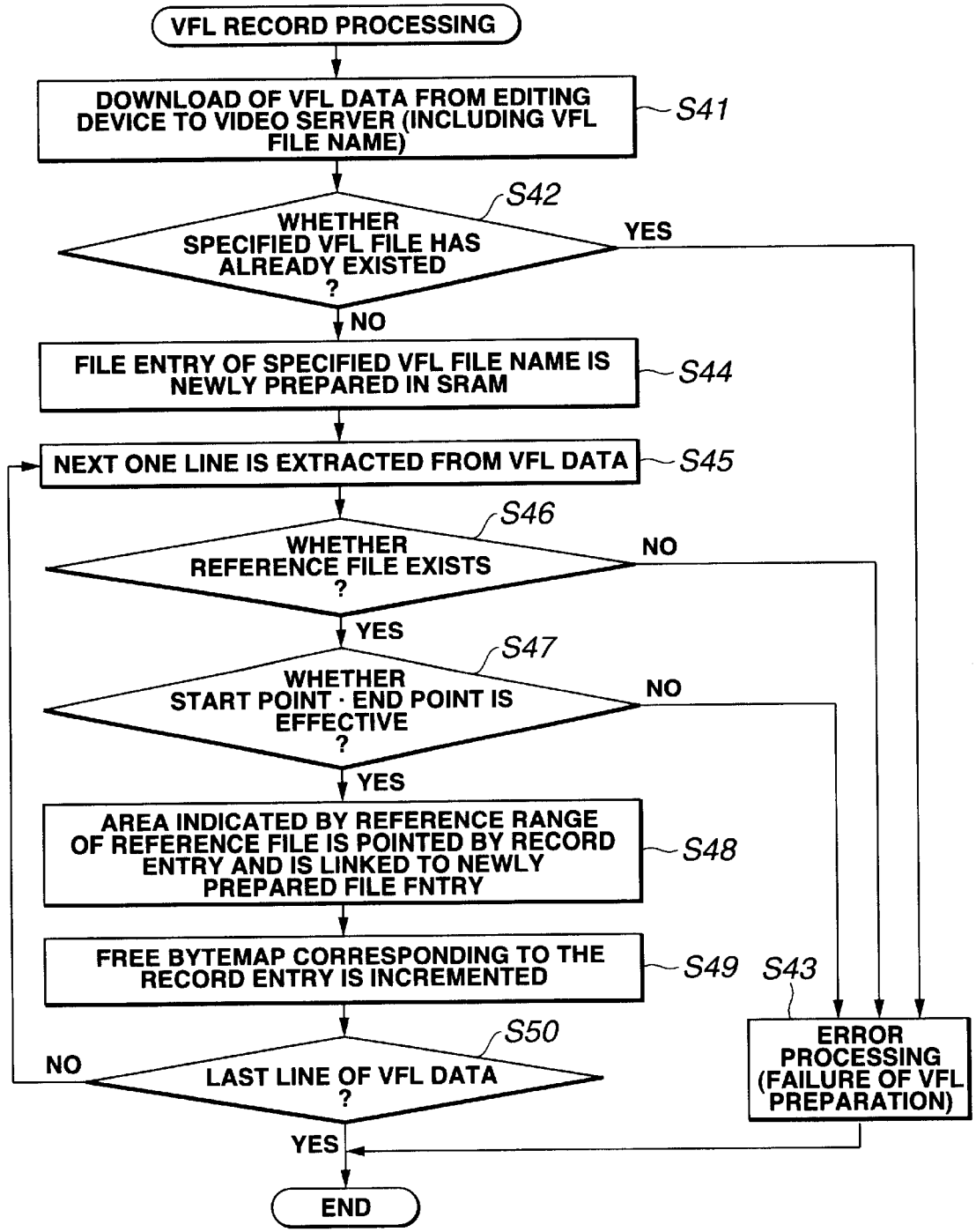
FIG. 15 is a flowchart for explaining record processing of a virtual file.

Next, with reference to a flowchart of FIG. 15, a description will be made on record processing for recording a virtual file in the case where file management information is constituted by the file entry in FIG. 2B, the record entry in FIG. 2C, and the free space byte map in FIG. 11.

The user operates the editing device 1 and repeats an operation of specifying a start point and an end point of a reference file for a necessary number of times. When VFL data as shown in FIG. 5A are prepared by this, at step S41, the VFL data are transmitted from the editing device 1 to the server 2 together with the file name of the virtual file to be recorded. The VFL data are received by the CPU 12 through the control signal I/F 11. At step S42, the CPU 12 refers to the file management information (file entry) stored in the SRAM 15. By doing this, the CPU 12 determines whether a file having the same file name as the file name transmitted together with the VFL data has already existed (been recorded in the disk array 21).

At step S42, in the case where it is judged that a file having the same file name as the file name transmitted together with the VFL data has already existed, the procedure proceeds to step S43. The CPU 12 performs error processing such as transmitting to the editing device 1 a message indicating that a new virtual file cannot be opened and terminates the record processing.

At step S42, in the case where it is judged that a file having the same file name as the file name transmitted together with the VFL data does not exist, the procedure proceeds to step S44. The CPU 12 creates a file entry in which the file name is placed. That is, the CPU 12 creates the file entry (FIG. 2B) which is provided with the file name transmitted together with the VFL data.

Then, at step S45, the CPU 12 extracts the first line of the VFL data as marked VFL data. The CPU 12 then proceeds to step S46 and refers to the file management information stored in the SRAM 15. By doing this, the CPU 12 judges whether the disk array 21 records a file having the same file name as the file name of the reference file in the marked VFL data. That is, the CPU 12 judges whether the reference file exists.

At step S46, in the case where it is judged that the reference file does not exist, that is, in the case where the disk array 21 does not record the file specified by the file name in the marked VFL data, the procedure proceeds to step S43. The error processing as described above is carried out, and the record processing is ended. Incidentally, in this case, processing to delete the file entry prepared at step S44 from the SRAM 15 is also carried out.

At step S46, in the case where it is judged that the reference file exists, the procedure proceeds to step S47. The CPU 12 judges whether the start point and the end point in the marked VFL data are effective.

At step S47, there may be the case where the CPU 12 determines that the start point and the end point in the marked VFL data are not effective. That is, there may be the case where, for example, AV data of the reference file specified by the file name in the marked VFL data are not recorded at the recording position of the disk array 21 specified by the start point and the end point in the marked VFL data. In this case, the procedure proceeds to step S43. The error processing as described above is carried out, and the record processing is ended. Incidentally, in this case, processing to delete the file entry prepared at step S44 from the SRAM 15 is also carried out.

At step S47, there may be the case where the CPU 12 determines that the start point and the end point in the marked VFL data are effective. That is, there may be the case where, for example, AV data specified by the start point and the end point in the marked VFL data belong to the reference file specified by the file name in the marked VFL data. In this case, the procedure proceeds to step S48. A record entry is prepared for every continuous recording area where AV data of the reference file specified by the marked VFL data are recorded, and is stored in the SRAM 15.

Incidentally, there may be the case where the marked VFL data belong to the first line of the VFL data transmitted from the editing device 1. In this case, at step S48, the file entry prepared at step S44 is also provided with link information for specifying a record entry managing a recording area where the first AV data of the virtual file are recorded.

Thereafter, the procedure proceeds to step S49. The CPU 12 increments by one the reference number of a cluster entry as to a cluster containing the continuous recording area managed by each record entry prepared at step S48. Thus, in this case, the reference number indicates not only the number of files referring to the cluster, but also the number of record entries (record entries managing the recording position of AV data recorded in the cluster) referring to the cluster.

After the processing of step S49, the procedure proceeds to step S50. The, it is judged whether the marked VFL data belong to the last line of the VFL data transmitted from the editing device 1.

At step S50, there may be the case where it is judged that the marked VFL data do not belong to the final line of the VFL data transmitted from the editing device 1. Namely, there may be the case where data which have not been made marked VFL data exist in the VFL data transmitted from the editing device 1. In this case, the procedure returns to step S45. VFL data at the next line of the current marked VFL data are newly extracted as marked VFL data. The processing subsequent to step S46 is repeated.

On the other hand, at step S50, there may be the case where it is judged that the marked VFL data do not belong to the last line of the VFL data transmitted from the editing device 1. That is, there may be the case where the VFL data transmitted from the editing device 1 do not include those which have not been made the marked VFL data. In this case, the record processing is ended.

Figure 16:
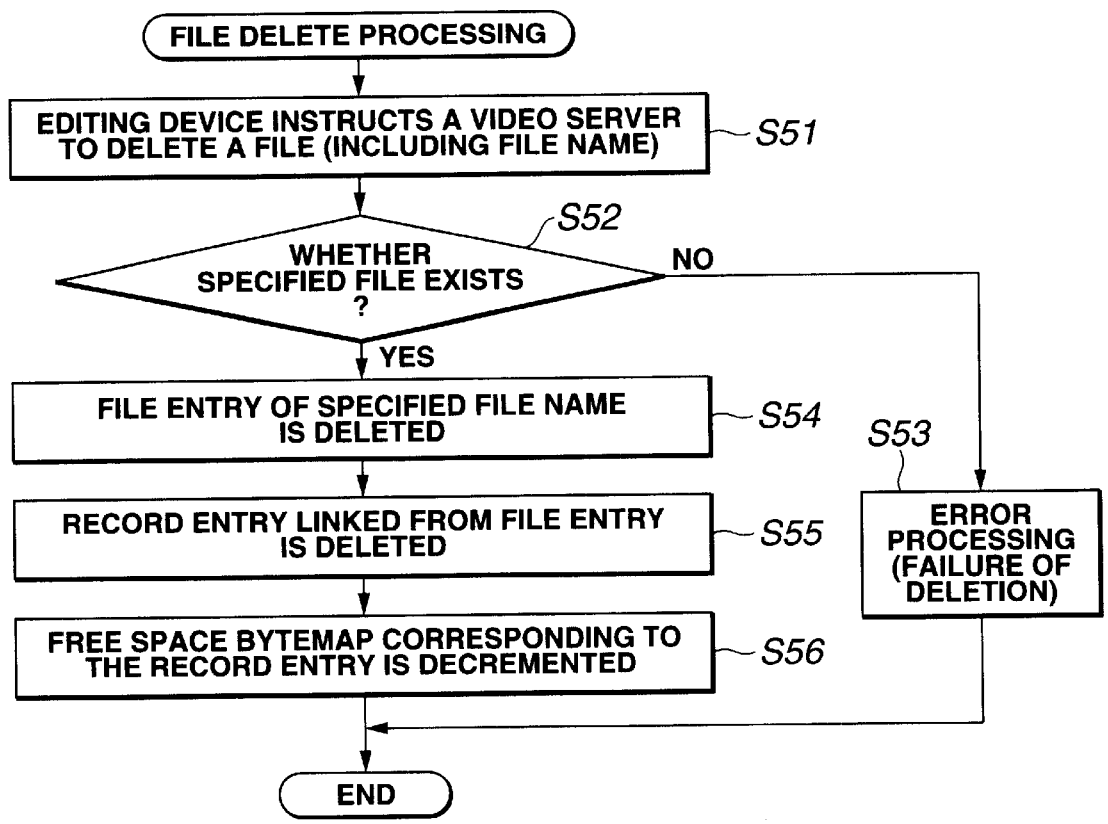
FIG. 16 is a flowchart for explaining record processing of a virtual file.

Next, with reference to a flowchart of FIG. 16, a description will be made on delete processing to delete a file in the case where file management information is constituted by the file entry in FIG. 2B, the record entry in FIG. 2C, and the free space byte map in FIG. 11.

There may be the case where the editing device 1 is operated so as to make deletion of a file. In this case, at step S51, the editing device 1 transmits to the video server 2 a delete command indicating deletion of the file. This command is transmitted together with necessary information such as a file name of the file to be deleted.

This delete command is received by the CPU 12 through the control signal I/F 11. At step S52, the CPU 12 refers to the file management information (file entry) stored in the SRAM 15. By doing this, the CPU 12 determines whether a file having the same file name as the file name transmitted together with the delete command has already existed (been recorded in the disk array 21).

At step S52, in the case where it is judged that a file having the file name transmitted together with the delete command does not exist, the procedure proceeds to step S53. The CPU 12 performs error processing such as transmitting to the editing device 1 a message which indicates that the file cannot be deleted. The CPU 12 then terminates the delete processing.

At step S52, in the case where it is judged that the file (delete object file) having the file name transmitted together with the delete command exists, the procedure proceeds to steps S54 and S55 sequentially. The CPU 12 deletes the file entry and the record entry of the delete object file from the SRAM 15.

Then, the procedure proceeds to step S56. The CPU 12 decrements by one the reference number of the cluster entry corresponding to the cluster containing the recording area managed by the record entry deleted at step S55. The CPU 12 then terminates the delete processing.

The delete processing as described above causes a cluster entry with the reference number 0. The cluster managed by such a cluster entry is released as a free area.

As described above, the free space byte map includes the reference number indicating references made to AV data recorded in each of clusters which are logically divided portions of the disk array 21. Using the free space byte map makes it possible to easily judge whether to enable or disable deletion of the AV data in units of clusters on the basis of the reference number. As a result, management of a file can be made easy, providing an effective use of the disk array 21.

This embodiment uses the disk array 21 comprising a plurality of HDs as a recording medium for recording AV data. Further, other recording media can be used. They include a randomly accessible disk-shaped recording medium such as a magneto-optical disk, a randomly accessible semiconductor memory such as a DRAM (Dynamic RAM) or a flash memory, and the like. When the semiconductor memory is used as the recording medium, a cluster, namely a logical unit of a recording area, can consist of, say, 1 byte or more.

Besides, this embodiment describes the case where the present invention is applied to the video server 2 which processes the AV data. Additionally, the present invention can also be applied to, for example, management of files in a general-purpose computer or the like.

Further, this embodiment uses the SRAM 15 for storing the free space byte map. Additionally, the free space byte map may be stored in the disk array 21, for example. That is, it is possible to ensure a 1-byte area in each cluster of the disk array 21 and record therein each cluster entry constituting the free space byte map. In this case, however, it takes a time to access the cluster entry recorded in the disk array 21. Because of this, it is desirable to use the cluster entry by loading it into the RAM 14 or the SRAM 15 when starting the device or the like, for example.

Besides, this embodiment uses the 1-byte cluster entry. It is also possible to assign an area larger or smaller than 1 byte to the cluster entry. That is, it is possible to determine the size of the cluster entry on the basis of, for example, the maximum file number of references made to the cluster.

Further, the number of sectors constituting the cluster is not particularly limited. However, decreasing the number of sectors constructing the cluster increases the number of clusters and the number of cluster entries. Accordingly, a large storage area becomes necessary as a storage (recording) area for holding the free space byte map. On the other hand, when one sector records AV data referred to by a virtual file, increasing the number of sectors constituting the cluster makes it impossible to delete the whole of the cluster containing the sector. This is not preferable in view of effective use of a recording area. Thus, it is desirable to determine the number of sectors constituting the cluster by balancing these factors, for example.

What is claimed is:

1. A file management device for managing a file in a randomly accessible recording medium, comprising:

storage means for storing file management information composed of file entry information including an identification name for identifying the file and a reference number indicative of the number of other files referring to the file, and record entry information having information for specifying a recording area, wherein the file comprises data continuously recorded in each of a plurality of recording areas dispersedly located on the recording medium and the storage means is operable to increment and decrement the reference number; and control means for controlling the storage means to store the file management information and for controlling reproduction of a data file containing audio visual data stored in the recording medium on the basis of the file entry information and the record entry information stored in the storage means.

2. The file management device according to claim 1, wherein information in the record entry information for specifying the recording area is information indicating a start position of an area which records the data file, wherein the control means controls the storage means so that the storage means stores the information for specifying the record entry information corresponding to the start position together with the file entry information for each of the data files, and wherein the control means controls the storage means so that the storage means stores information for specifying the record entry information corresponding to a start position in a next contiguous recording area on the recording medium when the data file is dispersedly recorded on the recording medium.

3. A file management device for managing a file in a randomly accessible recording medium, comprising:

storage means for storing file management information composed of file entry information including an identification name for identifying the file and a reference number indicative of the number of other files referring to the file, and record entry information having information for specifying a recording area, wherein the file comprises data continuously recorded in each of a plurality of recording areas dispersedly located on the recording medium; and control means for controlling the storage means to store the file management information and for controlling reproduction of a data file containing audio visual data stored in the recording medium on the basis of the file entry information and the record entry information stored in the storage means, wherein the control means controls the storage means so that editing information indicating a start position and an end position of the recording area in the file allows to store file management information of the editing information and increment and store a reference number for the file entry information.

4. The file management device according to claim 3, wherein when an instruction to delete the file is issued, the control means deletes file management information about the file stored in the storage means.

5. The file management device according to claim 3, wherein the control means controls the storage means so as to delete file management information corresponding to the editing information stored in the storage means from the storage means and allow the storage means to decrement and store the reference number for file entry information on a file corresponding to the editing information when an instruction to delete the editing information is issued.

6. The file management device according to claim 5, wherein the control means controls the storage means so as to delete file entry information and record entry information for the file from the storage means when the decremented reference number for the file reaches a specified value.

7. A file management method for managing files on a randomly accessible recording medium, comprising:

a first step of allowing storage means to store file management information comprising file entry information containing an identification name for identifying a file and a reference number indicating the number of other files referencing the file and record entry information for specifying a recording area, wherein the file comprises data continuously recorded in each of a plurality of recording areas dispersedly located on the recording medium and the storage means is operable to increment and decrement the reference number; and a second step of reproducing a data file containing audio visual data recorded on the recording medium on the basis of the file management information stored at the first step.

8. The file management method according to claim 7, wherein information for specifying the recording area of the record entry information is information indicating a start position of an area which records the data file, and wherein the first step allows the storage means to store information for specifying the record entry information corresponding to the start position together with the file entry information for each of the data files and stores information for specifying the record entry information corresponding to a start position in a next contiguous recording area on the recording medium when the data file is dispersedly recorded on the recording medium.

9. A file management method for managing files on a randomly accessible recording medium, comprising:

a first step of allowing storage means to store file management information comprising file entry information containing an identification name for identifying a file and a reference number indicating the number of other files referencing the file and record entry information for specifying a recording area, wherein the file comprises data continuously recorded in each of a plurality of recording areas dispersedly located on the recording medium;

a second step of reproducing a data file containing audio visual data recorded on the recording medium on the basis of the file management information stored at the first step; and a third step of allowing the storage means to store file management information for editing information and increment and store a reference number for the file entry information of the file when editing information indicating a start position and an end position of the recording area for the file is input.

10. The file management method according to claim 9 further comprising a fourth step of deleting file management information for the file stored in the storage means when an instruction to delete the file is issued.

11. The file management method according to claim 9 wherein when an instruction to delete the editing information is issued, the third step deletes file management information corresponding to the editing information stored in the storage means from the storage means, and decrements and stores the reference number for file entry information on a file corresponding to the editing information in the storage means.

12. The file management method according to claim 11 wherein the third step deletes file management information for the file from the storage means when the decremented reference number reaches a specified value.

13. An audio visual data recording/reproducing device comprising a randomly accessible recording medium, recording/reproducing means for recording or reproducing data containing audio visual data as a file from the recording medium, and a plurality of input/output means for outputting externally input data to the recording/reproducing means by making an access within a time slot allocated to the recording/reproducing means and inputting the data output from the recording/reproducing means, the device comprising:

storage means for storing file management information comprising file entry information containing an identification name for identifying the file and a reference number indicating the number of other files referencing the file and record entry information for specifying a recording area, wherein the file comprises data continuously recorded in each of a plurality of recording areas dispersedly located on the recording medium and the storage means is operable to increment and decrement the reference number; and control means for controlling the storage means to store the file management information in the storage means when the recording/reproducing means records the file on the recording medium and for controlling the recording/reproducing means to reproduce the data from the recording medium based on the file management information.

14. The audio visual data recording/reproducing device according to claim 13, wherein information in the record entry information for specifying the recording area is information indicating a start position on the recording medium where the file is recorded, and wherein the control means controls the storage means so that the storage means stores information for specifying the record entry information corresponding to the start position together with the file entry information for each of the data files and so that the storage means stores information for specifying the record entry information corresponding to a start position in a next contiguous recording area on the recording medium when the data file is dispersedly recorded on the recording medium.

15. An audio visual data recording/reproducing device comprising a randomly accessible recording medium, recording/reproducing means for recording or reproducing data containing audio visual data as a file from the recording medium, and a plurality of input/output means for outputting externally input data to the recording/reproducing means by making an access within a time slot allocated to the recording/reproducing means and inputting the data output from the recording/reproducing means, the device comprising:

storage means for storing file management information comprising file entry information containing an identification name for identifying the file and a reference number indicating the number of other files referencing the file and record entry information for specifying a recording area, wherein the file comprises data continuously recorded in each of a plurality of recording areas dispersedly located on the recording medium; and control means for controlling the storage means to store the file management information in the storage means when the recording/reproducing means records the file on the recording medium and for controlling the recording/reproducing means to reproduce the data from the recording medium based on the file management information, wherein the storage means is controlled so that the storage means stores file management information for editing information, and increments and stores a reference number for the file entry information of the file when editing information indicating a start position and an end position on the recording area for the file is input.

16. The audio visual data recording/reproducing device according to claim 15, wherein the control means controls the storage means so as to delete the file management information for the file stored in the storage means when an instruction to delete the file is issued.

17. The audio visual data recording/reproducing device according to claim 15, wherein the control means controls the storage means so as to delete file management information corresponding to the editing information stored in the storage means from the storage means, and decrement and store the reference number for file entry information on a file corresponding to the editing information in the storage means when an instruction to delete the editing information is issued.

18. The audio visual data recording/reproducing device according to claim 17, wherein the control means controls the storage means so as to delete file management information for the file from the storage means when the decremented reference number for the file reaches a specified value.

19. An audio visual data recording/reproducing method for recording/reproducing means which records and reproduces data containing audio visual data as a file on a randomly accessible recording medium to output the externally input data by accessing the recording/reproducing means and input the data output from the recording/reproducing means within a time slot period to which a plurality of input/output means is assigned for performing record and reproduction of the data, the method comprising:

a first step of allowing storage means to store file management information comprising file entry information containing an identification name for identifying the file and a reference number indicating the number of other files referencing the file and record entry information for specifying a recording area, wherein the file comprises data continuously recorded in each of a plurality of recording areas dispersedly located on the recording medium and the storage means is operable to increment and decrement the reference number; and a second step for allowing the recording/reproducing means to reproduce the data recorded on the recording medium on the basis of the file management information stored by the storage means at the first step.

20. The audio visual data recording/reproducing method according to claim 19, wherein information in the record entry information for specifying the recording area is information indicating a start position on the recording medium where the data is recorded, and wherein the first step allows the storage means to store information for specifying the record entry information corresponding to the start position together with the file entry information for each of the data files and to store information for specifying the record entry information corresponding to a start position in a next contiguous recording area on the recording medium when the data is dispersedly recorded on the recording medium.

21. An audio visual data recording/reproducing method for recording/reproducing means which records and reproduces data containing audio visual data as a file on a randomly accessible recording medium to output the externally input data by accessing the recording/reproducing means and input the data output from the recording/reproducing means within a time slot period to which a plurality of input/output means is assigned for performing record and reproduction of the data, the method comprising:

a first step of allowing storage means to store file management information comprising file entry information containing an identification name for identifying the file and a reference number indicating the number of other files referencing the file and record entry information for specifying a recording area, wherein the file comprises data continuously recorded in each of a plurality of recording areas dispersedly located on the recording medium; and a second step for allowing the recording/reproducing means to reproduce the data recorded on the recording medium on the basis of the file management information stored by the storage means at the first step; and a third step of allowing the storage means to store the file management information for editing information, and increment and store a reference number for the file entry information when editing information indicating a start position and an end position on the recording area for the file is input.

22. The audio visual data recording/reproducing method according to claim 21 further comprising a fourth step of deleting the file management information for the file stored in the storage means when an instruction to delete the file is issued.

23. The audio visual data recording/reproducing method according to claim 21, wherein when an instruction to delete the editing information is issued, the third step deletes file management information corresponding to the editing information stored in the storage means from the storage means, and decrements and stores the reference number for file entry information on a file corresponding to the editing information in the storage means.

24. The audio visual data recording/reproducing method according to claim 23, wherein the third step deletes file management information for the file from the storage means when the decremented reference number for the file reaches a specified value.

* * * * *